June 11, 1935.  J. GRISON  2,004,865
EXHAUST GAS PURIFIER FOR VEHICLES
Original Filed Jan. 25, 1933
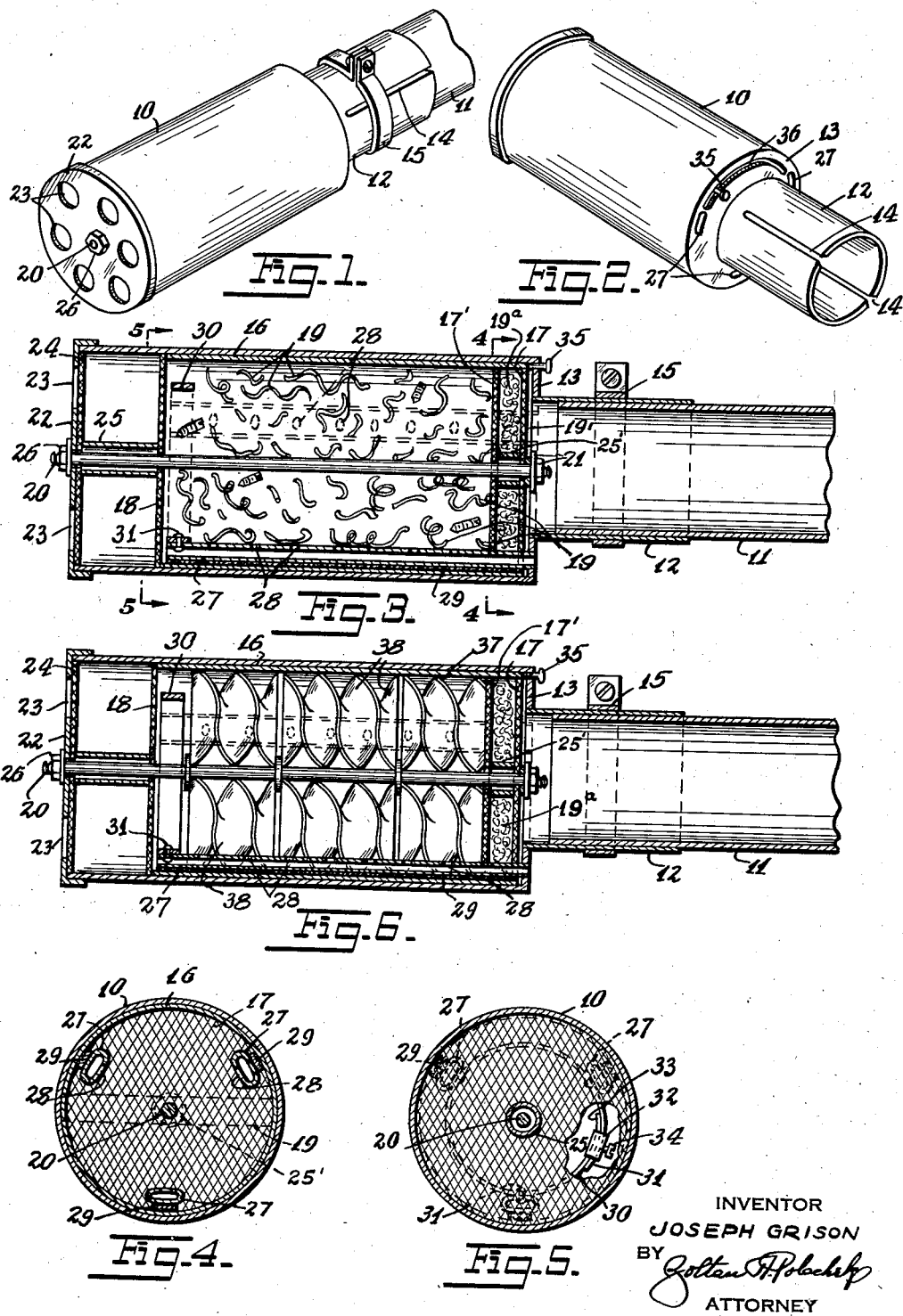
INVENTOR
JOSEPH GRISON
BY
ATTORNEY Patented June 11, 1935

2,004,865

UNITED STATES PATENT OFFICE 2,004,865

EXHAUST GAS PURIFIER FOR VEHICLES

Joseph Grison, Braintree, Mass.

Application January 25, 1933, Serial No. 653,377

5 Claims. (Cl. 23—288)

This invention relates to new and useful improvements in an exhaust gas purifier for gas motors.

The invention has for an object the construction of a purifier as mentioned which is characterized by the ability of oxidizing the carbon monoxide gas in the exhaust so as to produce carbon-dioxide gas.

Still further the invention proposes a novel arrangement of the tubular casing with a lining and a plurality of filling or scrap material within the lining, each of these elements being adapted to be readily oxidized upon the passing of hot exhaust gases and air to form a compound which may give off oxygen to change the CO to $CO_2$ in the exhaust gas.

Still further the invention proposes an arrangement whereby various copper screens or similar screens are associated with the exhaust of the gas.

Another one of the objects of this invention is the provision of an arrangement whereby the lining may be manually scraped or filed to remove dirt deposited, in time, which would interfere with the proper operation of the device. Still further the invention contemplates the arrangement of a plurality of tubular elements filled with filings and scraping filling material, said elements and filings being constructed of a material previously mentioned to oxidize the monoxide in the exhaust gas.

Still further the invention contemplates the use of aluminum as the lining material and scrap or filling material.

For further comprehension of the invention, and of the object and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of an exhaust gas purifier constructed according to this invention shown attached upon an exhaust pipe.

Fig. 2 is a rear elevation view of the purifier per se.

Fig. 3 is a longitudinal vertical sectional view of Fig. 1.

Fig. 4 is a transverse vertical sectional view taken on the line 4—4 of Fig. 3.

Fig. 5 is a vertical transverse sectional view taken on the line 5—5 of Fig. 3.

Fig. 6 is a view similar to Fig. 3 but illustrating a modified arrangement.

The exhaust gas purifier according to this invention comprises a tubular casing 10 adapted to be attached at one end upon the exhaust pipe 11 of gas motor. The attachment is facilitated by the provision of a short piece of pipe 12 adapted to engage over the end of the exhaust pipe 11 and secured within a ring shaped element 13 attached upon one end of the tubular casing. The pipe 12 is provided with a pair of diametrically opposite longitudinal cuts 14 to give it sufficient resiliency so that it may be clamped upon the exhaust pipe. A ring shaped clamp 15 is engaged around the pipe 12 and is adapted to accomplish the clamping of the pipe upon the exhaust.

A lining 16 is mounted within the tubular casing 10 and is adapted to be readily oxidized upon the passing of the hot exhaust gases and air to form a compound adapted to give off oxygen to change the CO to $CO_2$ in the exhaust gas. Preferably the lining 16 should be aluminum which forms various aluminum oxides readily adapted for the purpose.

A plurality of transverse screens 17, 17' and 18 are secured within the lining 16, more particularly at the ends thereof and so forms two compartments. Scraps or filing material 19 is filled into the compartment between the screens 17' and 18. This scrap material may be aluminum shavings or small objects made from aluminum for example, old screws and the like. The screens 17 and 18 preferably should be constructed of copper since then copper oxides will be produced which compounds are adapted to function to purify the exhaust gases. Between the screens 17, and 17' copper wool 19ª or other copper scrap or filing material is filled. Asbestos may also be used as strainer to trap the oil or grease. A transverse strap 19' is attached diametrically across the ring shaped element 13 and forms a bridge upon which a screw 20 is engaged. This screw extends longitudinally through the center of the tubular casing and at one end is provided with nuts 21 adapted to hold the screw in place.

A cover 22 is mounted upon the free end of the tubular casing 10 and is formed with a plurality of perforations 23 so as to allow the passage of air and gas. A screen 24 is arranged immediately within the cover 22 and preferably is constructed of copper or material which may readily oxidize to function to further aid in purifying the gas. The screen 24 is held spaced from the screen 18 by the provision of a small tubular member 25 which is engaged over the screw 23 and is disposed between the two screens. A nut 26 is threaded upon the free end of the screw 20 and serves to detachably hold the cover in place.

The copper screens 17' is held spaced from copper screen 17 by a small tubular member 25'.

Provision is made for supplying the interior of the tubular casing with a quantity of air necessary to form the oxides previously mentioned. For this purpose a plurality of air tubes 27 are mounted upon the ring shaped member 13 so as to connect with the atmosphere and to discharge into the tubular casing. Each of the air tubes 27 is formed with a plurality of lateral openings 28 adapted to discharge air within the compartment at various positions. The air tubes 27 extend substantially the entire length of the lining 16.

Furthermore a manually operable means is provided for cleaning the surface of the lining 16, which is necessary from time to time to remove objectionable deposits which would interfere with the proper oxidation of the lining. Many impurities within the exhaust gas such as traces of oil and carbon would be the objectionable ingredients mentioned. The means comprises a file or similar scraping element 29 attached upon each of the tubes 27 and extending the complete length of the tubes and in intimate contact with the inner face of the lining 16. These files 29 are urged into contact with the lining 16, under and by reason of a ring 30 secured by a rivet 31 upon the free extremity of one of the air tubes 27 and acting against the inner sides of the other air tubes 27 so as to reinforce and support and urge the air tubes and so accomplish proper holding of the files 29 in position. The ring 30 has overlapping ends 33 and a coupling 32 is mounted upon these ends in a manner so as to hold the ring in suitable expanded position to have sufficient inherent stress so as to forcefully urge the files on the air tubes 27 against the lining. The coupling 32 comprises merely a tubular element through which the ends 33 pass and a screw 34 threadedly engages the tubular element 32 and clamps the ends 33.

Furthermore a novel handle 35 is attached upon the edge of the lining 16 which is loose within the casing 10 so that it may be rotated and this knob extends to the exterior through an arcuate slot 36. Thus the knob 35 may be manually moved to cause the lining 16 to rotate first in one direction and then in the other so that the files 29 clean the inner surface of the lining.

In Fig. 6 a modified form of the invention has been disclosed which distinguishes from the previous form merely in the material which fills the compartment within the lining. More specifically this material comprises a plurality of spiral members 38 preferably of aluminum which are filled with aluminum filings 19 or similar aluminum scrap material. The tubular members 37 preferably are arranged in longitudinal rows within the lining. These tubular members 37 serve to aid in guiding the gases to pass through the tubular casing 10.

In other respects this form of the invention is identical to the prior form and its operation is also similar.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. An exhaust gas purifier for internal combustion engines, comprising a tubular casing adapted to be attached at one end upon the exhaust pipe of said motor, a cylindrical lining rotative within said tubular casing, a plurality of transverse screens within said lining dividing off compartments, scrap material within one of said compartments, said lining and said transverse screens and said scrap material being of metal adapted to readily oxidize upon the passage of hot exhaust gases and air to form a compound adapted to give off oxygen to change the CO to $CO_2$ in the exhaust gas, and air tubes on said casing to supply the necessary air into said compartment, means for moving said lining, and stationary cleaning elements engaging against the inside of said lining.

2. An exhaust gas purifier for internal combustion engines, comprising a tubular casing adapted to be attached at one end upon the exhaust pipe of said motor, a movable lining within said tubular casing, a plurality of transverse screens within said lining dividing off compartments, scrap material within one of said compartments, said lining and said transverse screens and said scrap material being of metal adapted to readily oxidize upon the passage of hot exhaust gases and air to form a compound adapted to give off oxygen to change the CO to $CO_2$ in the exhaust gas, and air tubes on said casing to supply the necessary air into said compartment, a perforated cover being attached upon the free end of said tubular casing, a screw extending through said cover and supported within said tubular casing, means associated with said screw to hold said transverse screens against displacement and a stationary element engaging against said lining to clean it when moved.

3. An exhaust gas purifier for internal combustion engines, comprising a tubular casing adapted to be attached at one end upon the exhaust pipe of said motor, a lining within said tubular casing, a plurality of transverse screens within said lining dividing off compartments, scrap material within one of said compartments, said lining and said transverse screens and said scrap material being of metal adapted to readily oxidize upon the passage of hot exhaust gases and air to form a compound adapted to give off oxygen to change the CO to $CO_2$ in the exhaust gas, and air tubes on said casing to supply the necessary air into said compartment, said casing having a reducing ring at one end, a pipe attached upon said ring and adapted to engage upon the exhaust pipe, and said air tubes being mounted upon said reducing ring, the inner ends of said air tubes being supported, and means manually operable for scraping and filing the inner surface of said lining.

4. An exhaust gas purifier for internal combustion engines, comprising a tubular casing adapted to be attached at one end upon the exhaust pipe of said motor, a lining within said tubular casing, a plurality of transverse screens within said lining dividing off compartments, scrap material within one of said compartments, said lining and said transverse screens and said scrap material being of metal adapted to readily oxidize upon the passage of hot exhaust gases and air to form a compound adapted to give off oxygen to change the CO to $CO_2$ in the exhaust gas, and air tubes on said casing to supply the necessary air into said compartment, said casing having a reducing ring at one end, a pipe attached upon said ring and adapted to engage upon the exhaust pipe, and said air tubes being mounted upon said reducing ring, the inner ends of said air tubes being supported, and means manually operable for scraping and filing the inner surface of said lining, comprising scraping elements attached upon said air tubes and in intimate contact with the inner surface of said lining, and said air tubes being urged under stress so that said scraping elements maintain their contacting positions.

5. An exhaust gas purifier for internal combustion engines, comprising a tubular casing adapted to be attached at one end upon the exhaust pipe of said motor, a lining within said tubular casing, a plurality of transverse screens within said lining dividing off compartments, scrap material within one of said compartments, said lining and said transverse screens and said scrap material being of metal adapted to readily oxidize upon the passage of hot exhaust gases and air to form a compound adapted to give off oxygen to change the CO to $CO_2$ in the exhaust gas, and air tubes on said casing to supply the necessary air into said compartment, said casing having a reducing ring at one end, a pipe attached upon said ring and adapted to engage upon the exhaust pipe, and said air tubes being mounted upon said reducing ring, the inner ends of said air tubes being supported, and means manually operable for scraping and filing the inner surface of said lining, comprising scraping elements attached upon said air tubes and in intimate contact with the inner surface of said lining, and said air tubes being urged under stress so that said scraping elements maintain their contacting positions, a handle being attached upon one end of said lining and extending through a slot in said tubular casing to the exterior, whereby the lining may be moved relative to said scraping material.

JOSEPH GRISON.